United States Patent
Black et al.

(10) Patent No.: US 11,102,538 B2
(45) Date of Patent: *Aug. 24, 2021

(54) SYSTEM AND METHOD FOR UBIQUITOUS APPLIANCE CONTROL

(71) Applicant: Universal Electronics Inc., Santa Ana, CA (US)

(72) Inventors: Jeremy Black, N. Tustin, CA (US); Patrick H. Hayes, Mission Viejo, CA (US)

(73) Assignee: Universal Electronics Inc., Santa Ana, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/825,458

(22) Filed: Mar. 20, 2020

(65) Prior Publication Data

US 2020/0221157 A1    Jul. 9, 2020

Related U.S. Application Data

(63) Continuation of application No. 15/040,124, filed on Feb. 10, 2016, now Pat. No. 10,638,187, which is a
(Continued)

(51) Int. Cl.
*H04N 21/422* (2011.01)
*H04L 12/28* (2006.01)
(Continued)

(52) U.S. Cl.
CPC ....... *H04N 21/4222* (2013.01); *H04L 12/282* (2013.01); *H04M 1/72415* (2021.01);
(Continued)

(58) Field of Classification Search
CPC . H04L 12/283; H04L 12/2838; H04L 12/282; H04L 2012/2849; H04L 12/2803;
(Continued)

(56) References Cited

U.S. PATENT DOCUMENTS 4,623,887 A   11/1986   Welles, II
4,894,789 A   1/1990   Yee
(Continued)

FOREIGN PATENT DOCUMENTS

EP   0561435 A2   9/1993
EP   0967797 A2   12/1999
(Continued)

OTHER PUBLICATIONS

Universal Electronics Inc., PRONTO User Guide, 1999, 77 pgs.
(Continued)

*Primary Examiner* — Sherrod L Keaton
(74) *Attorney, Agent, or Firm* — Greenberg Traurig, LLP

(57) ABSTRACT

A slave relay station is adapted to serve and/or host pages comprising a simplified graphic user interface (GUI) encoded in a widely recognized format such as, for example, HTML or WML. The GUI embodies activatable links corresponding to control functions for configured appliances. A wireless phone or other device with network access and the capability to process and present such pages, for example via a Web browser, may then be utilized to effect control of such appliances by simply navigating to the network address of the slave relay station, obtaining an appropriate GUI page, and interacting with the links.

10 Claims, 12 Drawing Sheets

Related U.S. Application Data continuation of application No. 12/147,770, filed on Jun. 27, 2008, now Pat. No. 9,294,705.

(51) Int. Cl.
*H04N 21/4363* (2011.01)
*H04N 21/6547* (2011.01)
*H04M 1/72415* (2021.01)

(52) U.S. Cl.
CPC . *H04N 21/42204* (2013.01); *H04N 21/42209* (2013.01); *H04N 21/42221* (2013.01); *H04N 21/42225* (2013.01); *H04N 21/42226* (2013.01); *H04N 21/43637* (2013.01); *H04N 21/6547* (2013.01); *H04L 2012/2841* (2013.01); *H04L 2012/2849* (2013.01)

(58) Field of Classification Search
CPC ..... H04L 12/2827; H04L 41/22; H04L 65/40; G06F 9/4443; G06F 11/3495; G06F 2209/544
See application file for complete search history.

(56) References Cited

U.S. PATENT DOCUMENTS

| | | |
|---|---|---|
| 4,959,810 A | 9/1990 | Darbee et al. |
| 5,005,084 A | 4/1991 | Skinner |
| 5,101,191 A | 3/1992 | MacFadyen et al. |
| 5,109,222 A | 4/1992 | Welty |
| 5,293,357 A | 3/1994 | Hallenbeck |
| 5,307,055 A | 4/1994 | Baskin et al. |
| 5,410,326 A | 4/1995 | Goldstein |
| 5,481,256 A | 1/1996 | Darbee et al. |
| 5,552,806 A | 9/1996 | Lenchik |
| 5,565,888 A | 10/1996 | Selker |
| 5,574,964 A | 11/1996 | Hamlin |
| 5,614,906 A | 3/1997 | Hayes et al. |
| 5,635,989 A | 6/1997 | Rothmuller |
| 5,642,303 A | 6/1997 | Small et al. |
| 5,648,760 A | 7/1997 | Kumar |
| 5,652,613 A | 7/1997 | Lazarus et al. |
| 5,671,267 A | 9/1997 | August et al. |
| 5,710,605 A | 1/1998 | Nelson |
| 5,724,106 A | 3/1998 | Autry et al. |
| 5,751,372 A | 5/1998 | Forson |
| 5,761,606 A | 6/1998 | Wolzien |
| 5,767,919 A | 6/1998 | Lee et al. |
| 5,793,438 A | 8/1998 | Bedard |
| 5,801,787 A | 9/1998 | Schein et al. |
| 5,828,419 A | 10/1998 | Bruette et al. |
| 5,835,864 A | 11/1998 | Diehl et al. |
| 5,838,775 A | 11/1998 | Montalbano |
| 5,855,006 A | 12/1998 | Huemoeller et al. |
| 5,900,875 A | 5/1999 | Haitani et al. |
| 5,901,366 A | 5/1999 | Nakano et al. |
| 5,910,776 A | 6/1999 | Black |
| 5,915,026 A | 6/1999 | Mankovitz |
| 5,938,757 A | 8/1999 | Bertsch |
| 5,956,025 A | 9/1999 | Goulden et al. |
| 5,959,751 A | 9/1999 | Darbee et al. |
| 5,970,206 A | 10/1999 | Yuen et al. |
| 5,974,222 A | 10/1999 | Yuen et al. |
| 6,002,394 A | 12/1999 | Schein et al. |
| 6,002,450 A | 12/1999 | Darbee et al. |
| 6,014,092 A | 1/2000 | Darbee et al. |
| 6,018,372 A | 1/2000 | Etheredge |
| 6,020,881 A | 2/2000 | Naughton et al. |
| 6,028,599 A | 2/2000 | Yuen et al. |
| 6,040,829 A | 3/2000 | Croy et al. |
| 6,097,441 A | 8/2000 | Allport |
| 6,104,334 A | 8/2000 | Allport |
| 6,127,941 A | 10/2000 | Van Ryzin |
| 6,130,726 A | 10/2000 | Darbee et al. |
| 6,133,909 A | 10/2000 | Schein et al. |
| 6,137,549 A | 10/2000 | Rasson et al. |
| 6,151,059 A | 11/2000 | Schein et al. |
| 6,172,674 B1 | 1/2001 | Etheredge |
| 6,177,931 B1 | 1/2001 | Alexander et al. |
| 6,195,589 B1 | 2/2001 | Ketcham |
| 6,211,856 B1 | 4/2001 | Choi et al. |
| 6,219,694 B1 | 4/2001 | Lazardis et al. |
| 6,225,938 B1 | 5/2001 | Hayes et al. |
| 6,256,019 B1 | 7/2001 | Allport |
| 6,278,499 B1 | 8/2001 | Darbee et al. |
| 6,285,357 B1 | 9/2001 | Kushiro et al. |
| 6,341,374 B2 | 1/2002 | Schein et al. |
| 6,369,840 B1 | 4/2002 | Barnett et al. |
| 6,408,435 B1 | 6/2002 | Sato |
| 6,437,836 B1 | 8/2002 | Huang et al. |
| 6,448,886 B2 | 9/2002 | Garber et al. |
| 6,463,463 B1 | 10/2002 | Godfrey et al. |
| 6,466,971 B1 | 10/2002 | Humpleman et al. |
| 6,532,589 B1 | 3/2003 | Proehl et al. |
| 6,563,430 B1 | 5/2003 | Kemink et al. |
| 6,577,350 B1 | 6/2003 | Proehl et al. |
| 6,587,067 B2 | 7/2003 | Darbee et al. |
| 6,741,684 B2 | 5/2004 | Kaars |
| 6,753,790 B2 | 6/2004 | Davies et al. |
| 6,774,811 B2 | 8/2004 | Kaufman et al. |
| 6,778,824 B2 | 8/2004 | Wonak et al. |
| 6,792,323 B2 | 9/2004 | Krzyzanowski et al. |
| 6,823,188 B1 | 11/2004 | Stern |
| 6,832,251 B1 | 12/2004 | Gelvin et al. |
| 7,093,003 B2 | 8/2006 | Yuh |
| 7,194,259 B2 | 3/2007 | DeLine |
| 7,589,642 B1 | 9/2009 | Mui |
| 7,631,197 B2 | 12/2009 | Niwamoto |
| 7,904,074 B2 | 3/2011 | Karaoguz |
| 2002/0190956 A1* | 12/2002 | Klein ............... G06F 1/1632 345/169 |
| 2003/0076240 A1 | 4/2003 | Bae et al. |
| 2003/0095211 A1 | 5/2003 | Nakajima |
| 2003/0103088 A1* | 6/2003 | Dresti ............... H03J 1/0025 715/835 |
| 2004/0203592 A1 | 10/2004 | Kermode et al. |
| 2004/0260427 A1 | 12/2004 | Wimsatt |
| 2005/0035846 A1 | 2/2005 | Zigmond et al. |
| 2005/0080496 A1 | 4/2005 | Hayes et al. |
| 2005/0097478 A1 | 5/2005 | Killian et al. |
| 2005/0097618 A1 | 5/2005 | Arling et al. |
| 2005/0138785 A1 | 6/2005 | Moore et al. |
| 2005/0159823 A1 | 7/2005 | Hayes et al. |
| 2005/0242167 A1 | 11/2005 | Kaario et al. |
| 2006/0050142 A1 | 3/2006 | Scott et al. |
| 2006/0143572 A1 | 6/2006 | Scott |
| 2006/0259864 A1 | 11/2006 | Klein et al. |
| 2006/0288300 A1 | 12/2006 | Chambers et al. |
| 2008/0294667 A1 | 11/2008 | Kopf |

FOREIGN PATENT DOCUMENTS

| | | |
|---|---|---|
| EP | 0987888 A1 | 3/2000 |
| EP | 1204275 A2 | 5/2002 |
| EP | 1042714 B1 | 4/2003 |
| EP | 1023650 B1 | 9/2003 |
| EP | 1044400 B1 | 4/2006 |
| GB | 2343073 A | 4/2000 |
| JP | 02001209551 | 8/2001 |
| WO | 00/39722 A1 | 7/2000 |
| WO | 0040016 | 7/2000 |
| WO | 0058935 | 10/2000 |
| WO | 0120572 A1 | 3/2001 |
| WO | 01/24387 A1 | 4/2001 |
| WO | 03/007588 A2 | 1/2003 |

OTHER PUBLICATIONS

"The untold RFID Story: Product Innovations in Electronics"—IBM Business Consulting Services, ibm.com/bcs, Sep. 2004.
"Interacting with Home and Home Appliances in a Hand-Held Terminal", Aaltonen et al., Nokia Research Center.

(56) References Cited

OTHER PUBLICATIONS

"A Method of Appliance Detection Based on Features of Power Waveform"—Masahito et al., Tokyo University of Technology School of Computer Science, 2004 IEEE.
WIPO, International Preliminary Report on Patentability of PCT Application No. US09/48254, dated Aug. 6, 2009, 7 pages.
European Patent Office, Examination Report issued on European patent application No. 09770869.7, dated Jul. 31, 2015, 4 pages.
U.S. Patent and Trademark Office, Non-Final Office Action issued on U.S. Appl. No. 15/711,381, dated Nov. 16, 2018, 17 pgs.
U.S. Patent and Trademark Office, Non-Final Office Action issued on U.S. Appl. No. 15/711,381, dated Oct. 18, 2019, 15 pgs.

* cited by examiner

File "switch_to_abc.irm

SYSTEM AND METHOD FOR UBIQUITOUS APPLIANCE CONTROL

RELATED APPLICATION INFORMATION

This application claims the benefit of and is a continuation of U.S. application Ser. No 15/040,124, filed on Feb. 10, 2016, which application claims the benefit of and is a continuation of U.S. application Ser. No. 12/147,770, filed on Jun. 27, 2008, the disclosures of which are incorporated herein by reference in their entirety.

BACKGROUND

Portable controlling devices, such as for example universal remote controls, and the features and functions offered by such devices are well known in the art. Increasingly sophisticated implementations of these devices incorporate technologies such as color touch screens, wireless home network compatibility, user configurable graphical user interfaces, slave relay stations positioned to control appliances not situated in line of sight of the controlling device, etc. Contemporaneously, personal communication, productivity, and entertainment devices such as cellular phones, portable email devices, hand-held games, etc. have begun to offer features such as graphical user interfaces on color touch screens, wireless Internet capability, etc.

SUMMARY OF THE INVENTION

This invention relates generally to systems and methods for adapting various appliance control capabilities of a universal remote control system such that they may be ubiquitously accessed by personal communication devices within a wireless network. Specifically, one or more network-capable slave relay stations installed in conjunction with a universal remote control device may additionally be adapted to serve and/or host pages comprising a simplified graphic user interface (GUI) encoded in a widely recognized format such as for example HTML or WML, which GUI embodies activatable links corresponding to control functions for configured appliances. A wireless phone or other device with network access and the capability to process and present such pages, for example via a Web browser, may then be utilized to effect control of such appliances by simply navigating to the network address of that slave relay station. Such devices may include without limitation cellular phones, smartphones, personal productivity devices, personal gaming, audio, or video players, game controllers, PDAs, etc., all collectively referred to hereafter as personal communication devices.

In some embodiments, the GUI pages to be served by slave relay stations may be created using the same editor as provided for use in creating or modifying the universal controlling device graphical user interface. Further, in certain embodiments the GUI pages to be served may be dynamically selected, scaled, or otherwise modified by a local or remote service based upon the known or inferred capabilities of the requesting personal communication device.

A better understanding of the objects, advantages, features, properties, and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
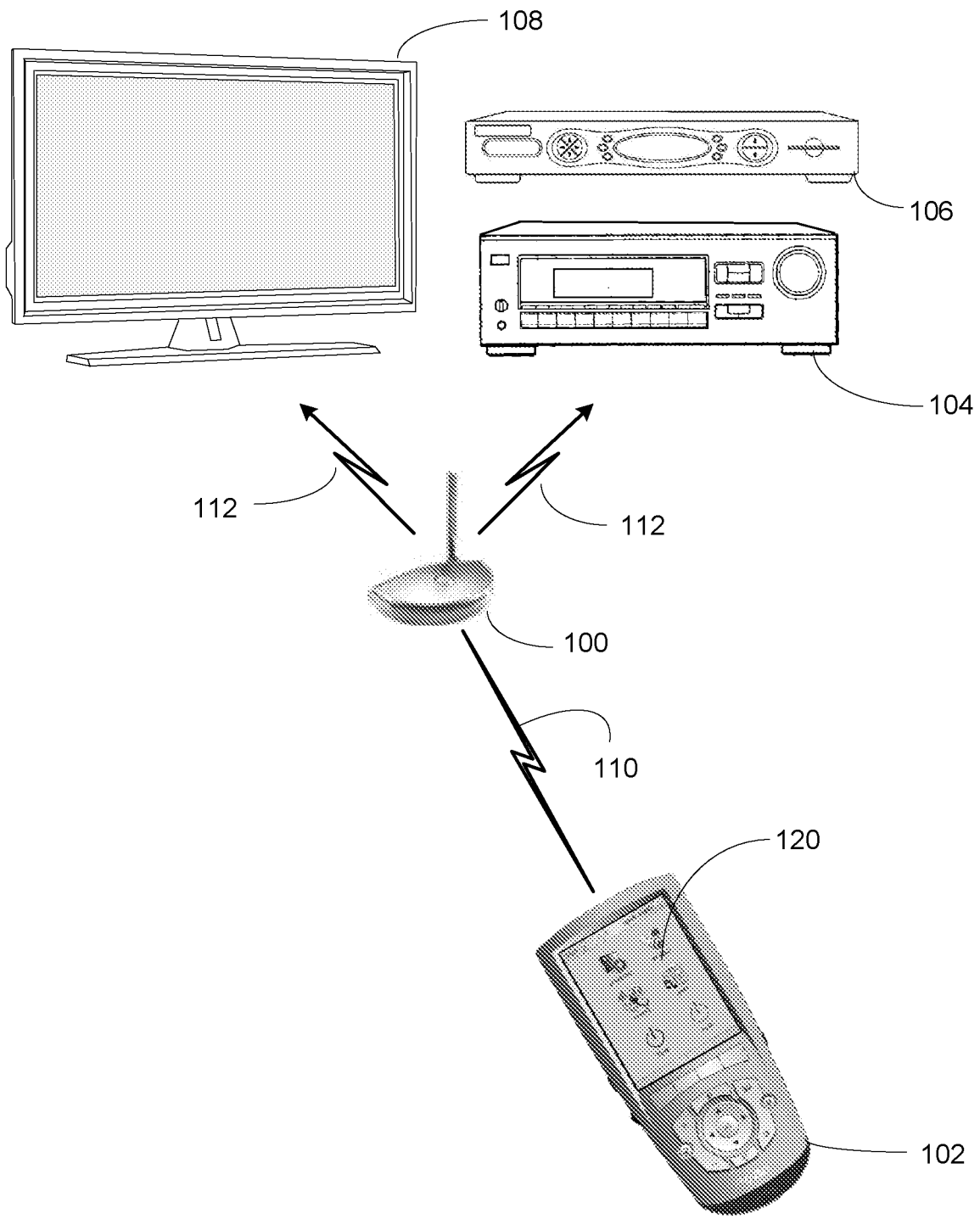
FIG. 1 illustrates an exemplary prior art universal controlling device and system.
Figure 2:
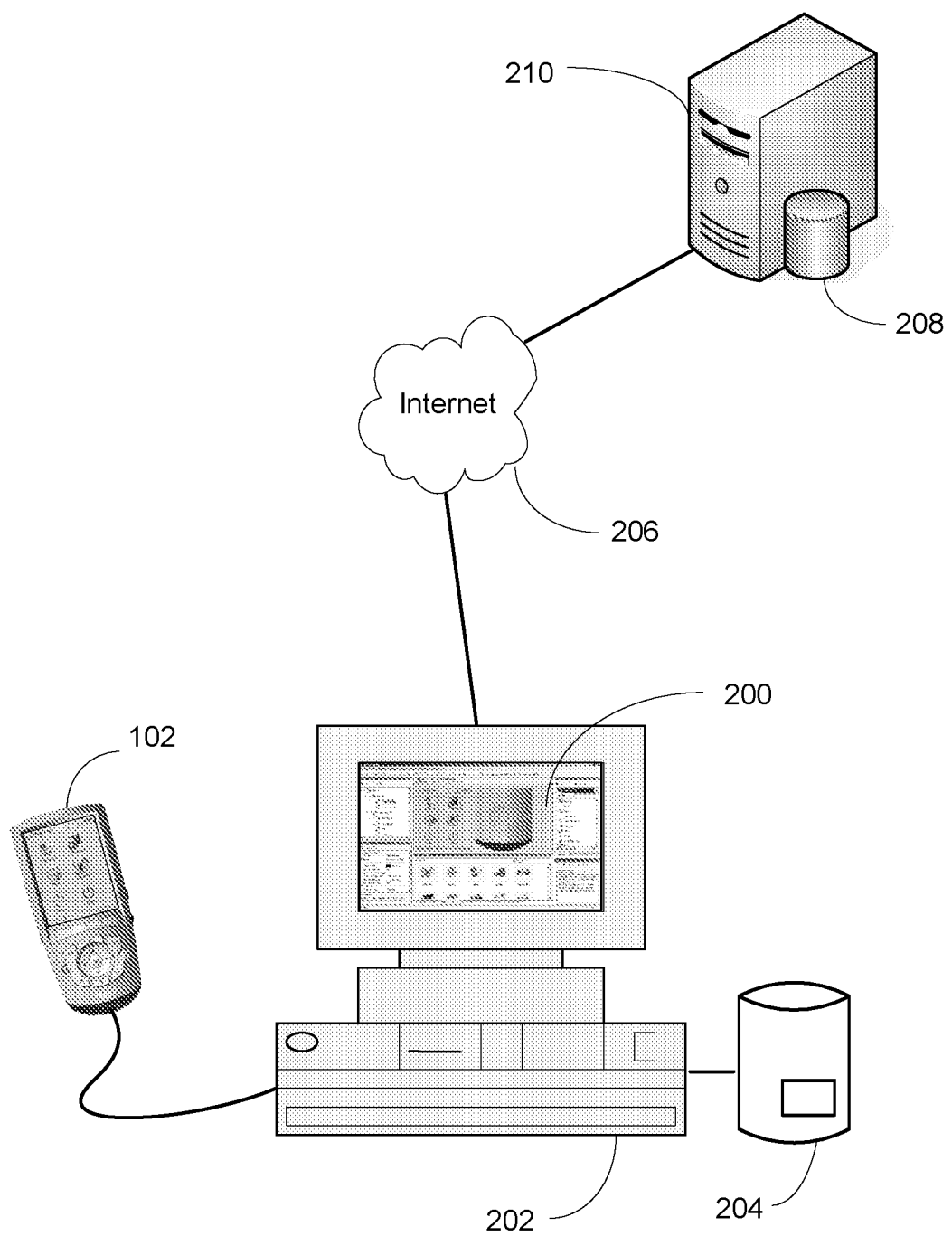
FIG. 2 illustrates an exemplary prior art system for creating graphical user interface pages for the controlling device of FIG. 1.

With reference to FIGS. 1 and 2, which are representative of prior art, it is known to provide a universal controlling device 102 comprising a touch screen graphical user interface 120 through which various appliances, for example a TV 108, cable set top box (STB) 104 and/or AV receiver 104 may be controlled. For further detail regarding this type of controlling device, reference may be made to U.S. Pat. No. 7,143,214, entitled "Hand Held Device Having a Browser Application," or 7,266,777, entitled "Configurable Controlling Device Having an Associated Editing Program," both of like assignee and incorporated herein by reference in their entirety.

In order to facilitate control of infrared (IR) signal responsive appliances which are not positioned in line of sight of controlling device 102, it is also known to provide a slave relay station 100 which receives RF communications 110 from controlling device 102 and outputs IR signals 112 to the various controlled devices. In the simplest form, said slave relay station may consist of nothing more than an analog RF demodulator and IR remodulator such as described, for example, in U.S. Pat. No. 5,142,397, entitled "System for Extending the Effective Operational Range of an Infrared Remote Control System." However, in the more general case where the RF communication path 110 utilizes a standardized protocol such as for example WiFi, Bluetooth, Zwave, Zigbee, etc., the slave relay device 100 may be required to receive and decode incoming messages in one format and translate these into IR commands (or even sequences of commands) having one or more different format(s) recognizable by the intended target device(s) for said commands. In this regard, see for example the "Nevo Link" brochure NSL007-2 published by Universal Electronics Inc. which is incorporated herein by reference in its entirety. To this end, the slave relay devices contemplated by the teachings of this invention incorporate processing capabilities, as will be described in greater detail in conjunction with FIG. 3.

As illustrated in FIG. 2, it is also known to provide application software comprising an editor 200 for execution on a PC 202 or other computer which may be used to configure and create individualized graphical user interfaces and command libraries for downloading into a controlling device 102. Such editor software may also be used to configure/assign slave relay device(s) 100 attached to a local area network and accessible to controlling device 102. The editor software may make use of local 204 and/or remote 208 database facilities for the retrieval of appliance command data, interface graphics, etc., as well as for storage of edited configurations. Remote database 208 may be hosted on a server 210 accessible via, for example, the Internet or a similar wide area network 206. For further detail regarding controlling device editor applications, the reader may refer to, for example, the aforementioned U.S. Pat. Nos. 7,266,777, 6,211,870, entitled "Computer Programmable Remote Control," and pending U.S. patent application Ser. No. 11/357,681, entitled "Configurable Controlling Device and Associated Configuration Distribution System and Method," all of like assignee and incorporated herein by reference in their entirety, as well as U.S. Pat. No. 6,937,972, entitled "Fully Functional Remote Control Editor and Emulator," also incorporated herein by reference in its entirety.

Figure 3:
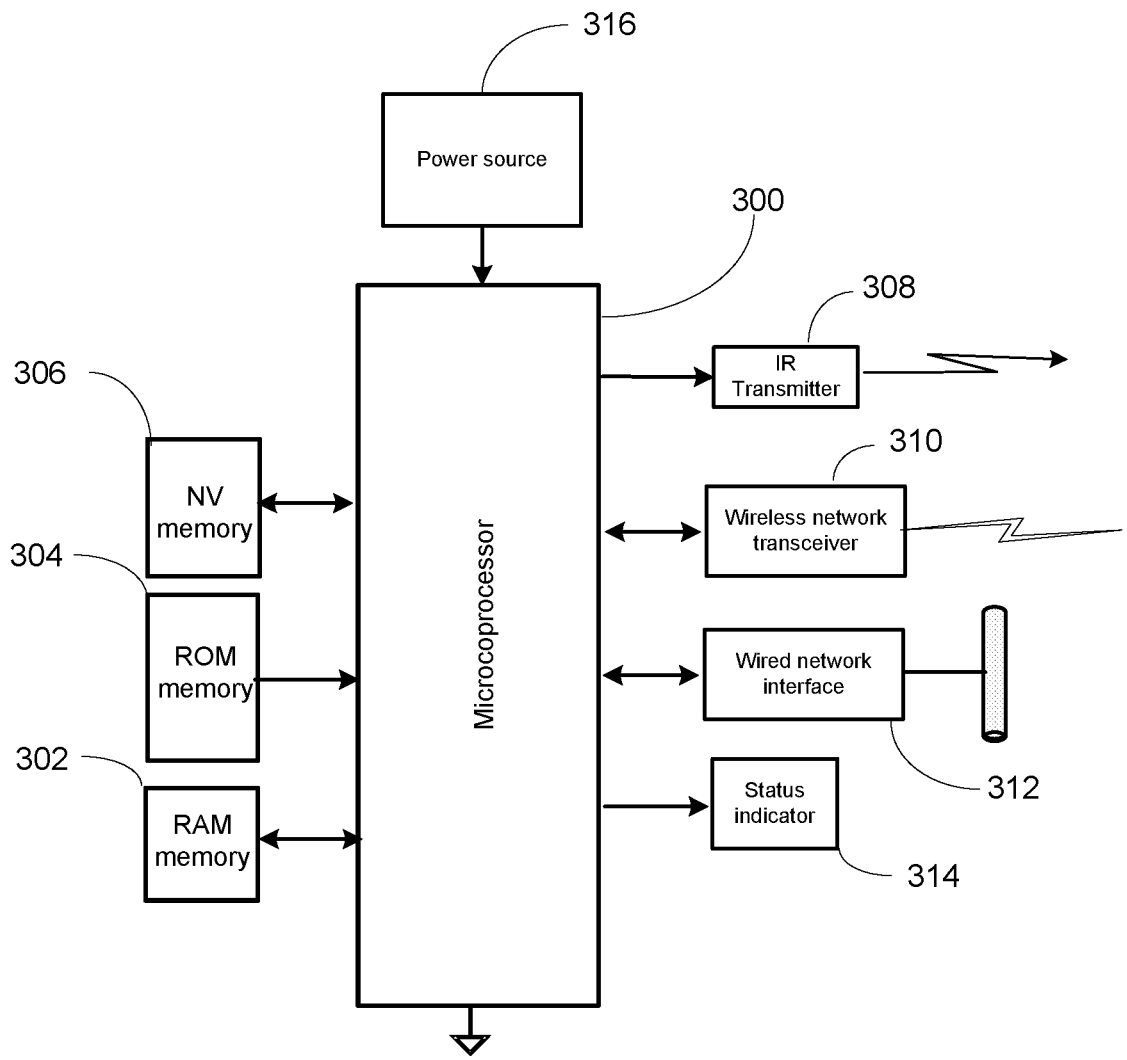
FIG. 3 illustrates a block diagram of exemplary components of an exemplary slave relay device.

Turning now to FIG. 3, the architecture of an exemplary slave relay station is illustrated in block diagram form. For use in commanding the functional operations of one or more appliances in response to messages received via a wired or wireless network connection, a slave relay station 100 may include, as needed for a particular application, a processor 300 coupled to a ROM memory 304, a RAM memory 302, a non-volatile read/write memory 306, circuit(s) 308 for transmission of operating commands to appliances (e.g., IR and/or RF), a wireless network transceiver 310 (e.g. WiFi, Bluetooth, etc.) and/or a wired network interface 312 (e.g. Ethernet) for communication with a local network, a means 314 to provide feedback to the user (e.g., one or more LEDs, LCD display, speaker, and/or the like), and a power source 316.

As will be understood by those skilled in the art, some or all of the memories 302, 304, 306 may include executable instructions (collectively, the program memory) that are intended to be executed by the processor 300 to control the operation of the slave relay station 100, as well as data that serves to define appliance control protocols and command values to the operational software (the appliance code data). In this manner, the processor 200 may be programmed to control the various electronic components within the slave relay station 100 and process the input and output data thereof, for example, to receive and transmit data via network interfaces 308 and/or 310, to act upon commands and requests embodied in such data, to cause the transmission of appliance command signals via transmission circuits(s) 308 to appliances to be controlled, to control visual feedback device(s) 314, etc. In a contemplated embodiment, the non-volatile read/write memory 306, for example an EEPROM, battery-backed up RAM, FLASH, Smart Card, memory stick, or the like, may additionally be used to store HTML page data for serving to requesting devices, as described in greater detail hereafter. While the memory 304 is illustrated and described as a ROM memory, memory 304 may also be comprised of any type of readable media, such as ROM, FLASH, EEPROM, or the like. Preferably, the memories 304 and 306 are non-volatile or battery-backed such that data is not required to be reloaded after power interruptions. In addition, the memories 302, 304, and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the slave relay device 100 to perform an action, slave relay device 100 is adapted to be responsive to events, such as a received signal from network interface port 310 or 312. In response to an event, appropriate instructions within the program memory (hereafter the "operating program") may be executed. For example, receipt of a command message from controlling device 102 may result in the retrieval from the appliance code data the command value and control protocol appropriate for an intended target device and a resulting transmission of the requested command to the intended target appliance, e.g., the STB 106, in a format recognizable by the intended target appliance. Additionally, in keeping with the teachings of the instant invention, receipt of, for example, an HTTP page request from a browser capable, client, personal communication device may result in the retrieval of HTML formatted data and serving of a page comprised of the HTML formatted data back to the requesting client, as will be described in greater detail hereafter.

For selecting a set of appliance code data to be associated with an appliance to be controlled, data may be provided to the slave relay device 100 that serves to identify an intended target appliance by its type and make (and sometimes model). Such data may allow the slave relay device 100 to identify the appropriate appliance code data elements within a preprogrammed library of appliance code data, to be used to transmit recognizable commands in a format appropriate for such identified appliances. Alternatively, either in place of or in addition to a pre-stored library, appliance code data may be downloaded into slave relay device 100 via a network interface(s) 310, 312 either during an initialization phase or on an as required basis.

Figure 4A:
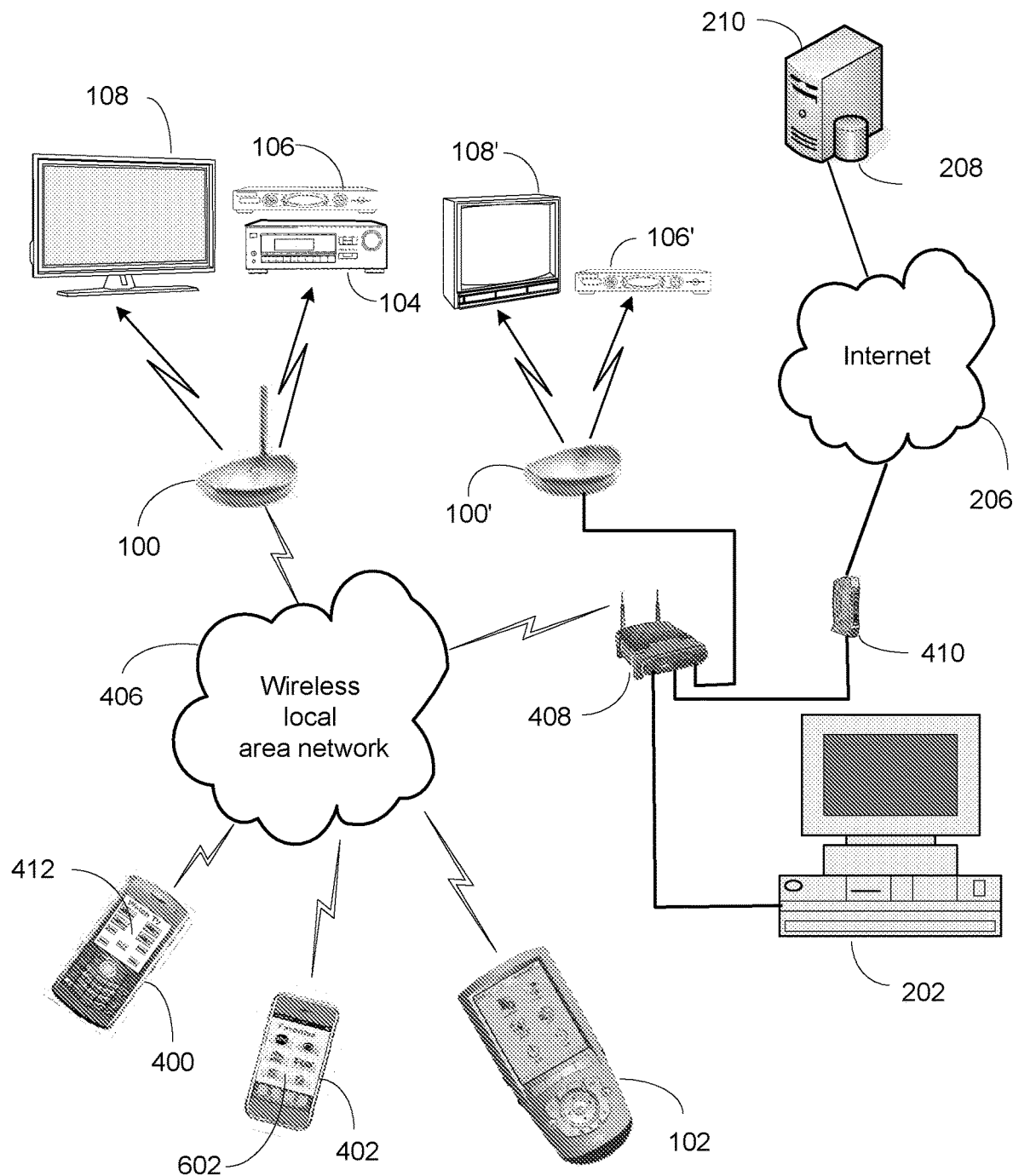
FIGS. 4a and 4b illustrate exemplary systems in which exemplary personal communication devices may be used as controlling devices in accordance with the teachings of the instant invention.

Referring now to FIG. 4a, in an exemplary embodiment a wireless local area network 406, for example a WiFi network, provides a means for communication between slave relay devices 100 and 100' and a universal controlling device 102. Slave relay devices 100 and 100' provide a conduit for controlling device 102 to issue operational commands to appliances 108, 106, 104 and 108', 106' respectively. Various embodiments of such slave relay devices may interface directly to wireless network 406 (e.g., via a built-in wireless network transceiver 310) as illustrated by device 100, or may interface to the network via a hardwired connection to a router 408 (e.g., via a built-in wired network interface 312) as illustrated by device 100'. In either case, wireless commands originating from controlling device 102 are converted into appliance control commands of a format suitable for use with the target appliance(s), e.g. 104, 106 or 108, as previously described in conjunction with FIGS. 1 and 3. A local personal computer 202 or other device having Internet connectivity and an Internet connection 410 (e.g., a cable modem) are also connected to router 408 and thus accessible via the wireless local network 406.

In an exemplary embodiment, in addition to servicing requests from universal controlling device 102 as is known in the art, the illustrated slave relay devices 100 and 100' of the instant invention are also capable of serving HTML-formatted pages over local area network 406 as requested by browser-capable devices such as personal communications devices 400 or 402, thereby allowing such devices to be used as surrogate or additional universal controlling devices, as will be described hereafter in greater detail.

Figure 4B:
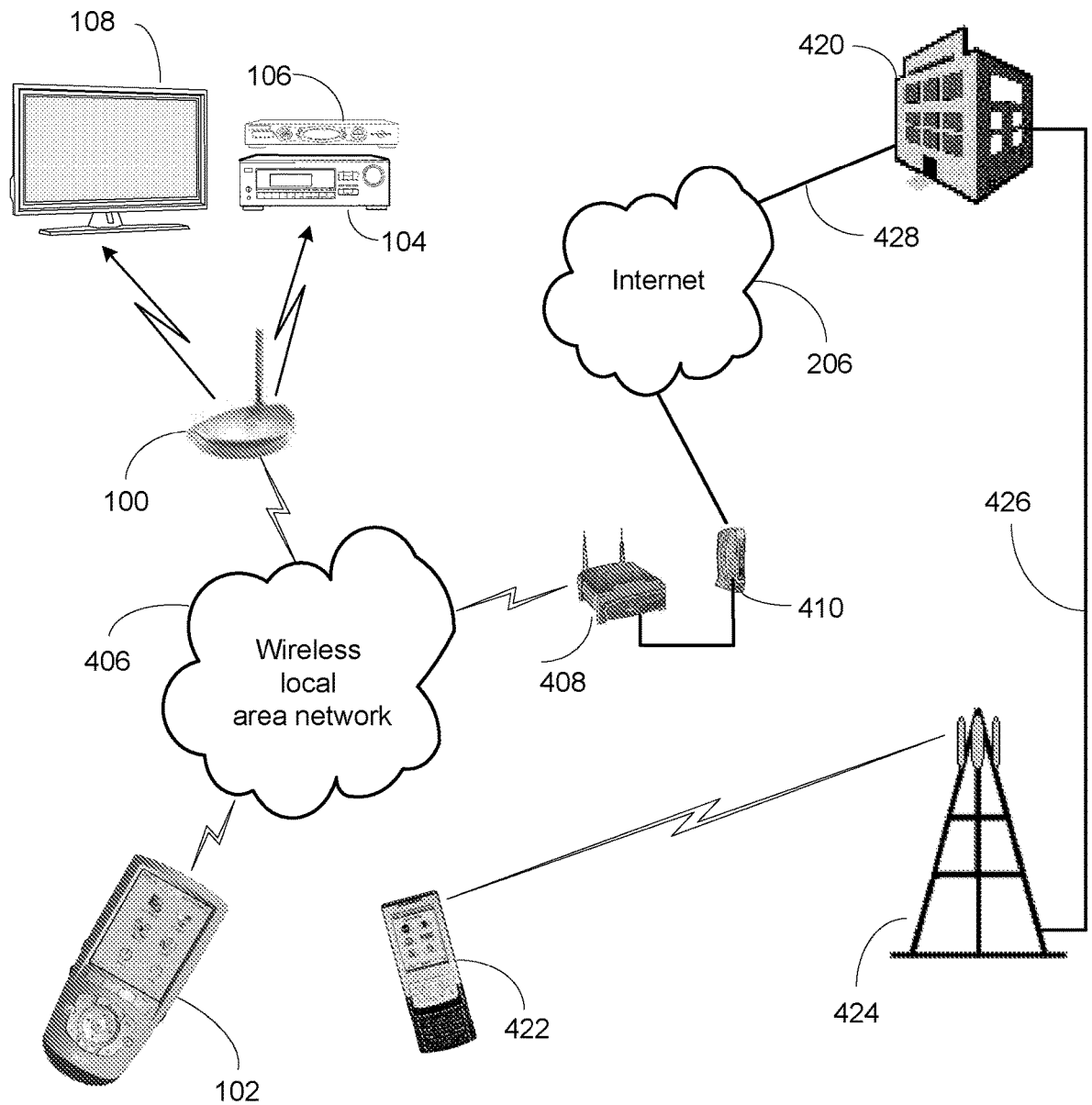

As will be appreciated by those of skill in the art, not all personal communication devices may be equipped to communicate directly with a local network (e.g., have a WiFi capability). As illustrated in FIG. 4b, certain exemplary personal communication devices, e.g., cell phone 422, may be adapted to communicate only via a closed wide area network 424, 426 (e.g., a cellular phone network) to a contracted service provider 420. Such a personal communication device may however offer access to the Internet 206 via a service provider gateway 428. In such cases, it will be appreciated that the exemplary personal communication device may request HTML formatted GUI pages from slave relay station 100 via Internet 206 and local router 408. Accordingly in the discussions that follow, it is to be understood that the services described are not intended to be limited to only those devices which are equipped to directly access local network 406.

Figure 5:
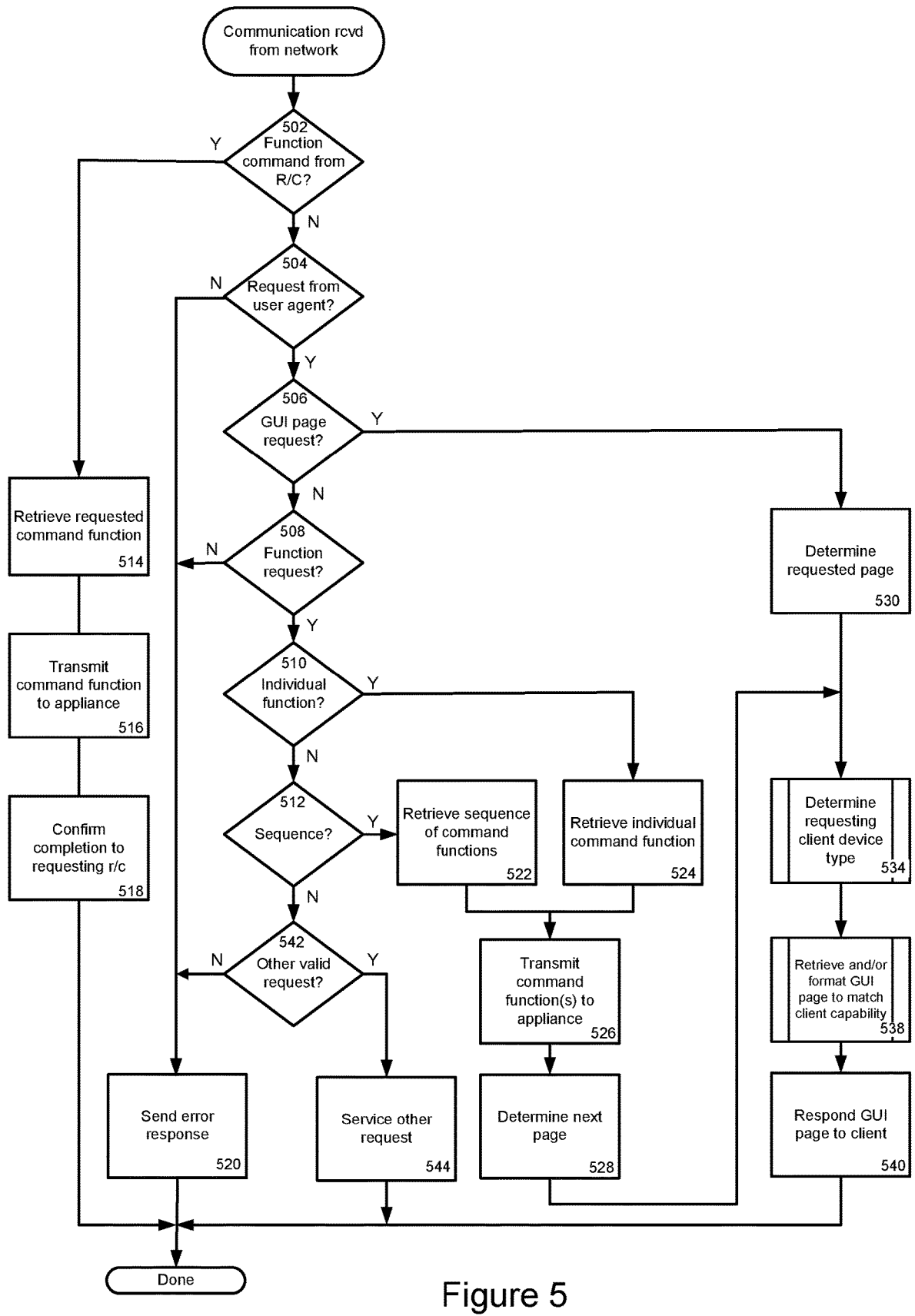
FIG. 5 illustrates in flow chart form exemplary actions of an exemplary slave relay device when serving GUI pages to a personal communication device.

Turning now to FIG. 5, there is illustrated in flowchart form an exemplary series of steps which may be performed by the operating program of a slave relay device upon receipt of a communication from the local network. While for the purpose of this illustrative example certain terminology common to a WiFi-based local network and HTTP transaction protocol may be used for clarity, this is not intended to be limiting as it will be appreciated that the concepts presented may be practiced equally effectively using other appropriate network architectures and/or protocols.

Upon initial receipt of a network communication, at step 502 the operating program of the slave relay station may first determine if the communication comprises a function command from an associated universal controlling device (e.g., controller 102). If so, at steps 514, 516 and 518 the operating software may retrieve the requested command function from the appliance code data previously associated with the desired appliance, transmit that command to the appliance in the appropriate format, and then issue a completion confirmation response to the initiating device, all as is known in the prior art.

If the received communication is not a function command from a universal controlling device, the operating software may next determine if the communication is a request from a user agent, e.g., a browser application resident in a networked device such as personal communication devices 400, 402, or 422 (each alternatively referred to hereafter as the "client device"). If not, at step 520 an error message, e.g., an HTTP "Error 404—Not Found" response is issued to the originating network device. Alternatively the operating software may be configured to issue a simplified default interface page in the event that the unknown client device is able to render rudimentary HTML or other markup language pages. If the communication is a recognized user agent request, the operating software at step 506 then determines if this is GUI page request, e.g., a request for an HTML file.

If so, at step 530 the operating software resolves the request file path and determines the GUI page to be served in response to the user agent request. (If any error is encountered, e.g., the file path/name does not exist, an error response akin to step 520 may be issued to the requesting device. For the sake of clarity, this and other similar error conditions are not exhaustively illustrated in the flowchart of FIG. 5.) Once the GUI page to be served has been identified, the operating software at step 534 may next optionally determine the requesting client device type and capabilities. This may include, for example, examining various fields in the received request (for example, "accept" and "user agent" data in an HTTP request header) or other pre-defined identification data, searching a local or remote cross-reference table of IP or MAC addresses to device types, or even interacting with the requesting device itself to obtain the identification data. Alternatively, a fixed set of device capabilities for the request issuing device may have been predetermined at the time the slave relay device was configured. Once the client device capabilities are known or inferred, at step 538 the page data corresponding to the identified GUI page may be scaled or reformatted, or an alternate GUI page selected, based on the capabilities of the client device. This process will be described in greater detail later. Finally, at step 540 the requesting client device is responded to with the GUI page data.

Figure 6:
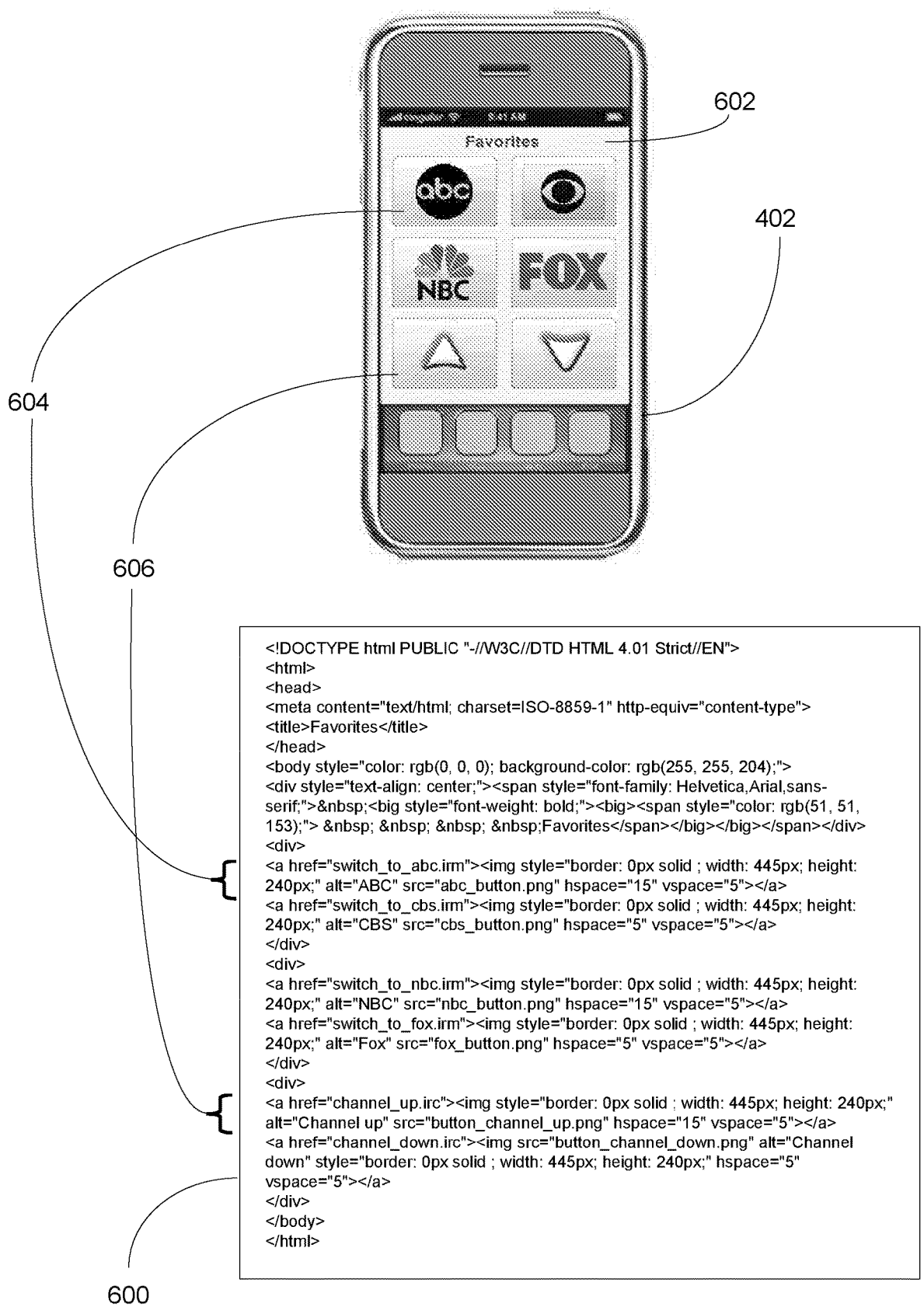
FIG. 6 illustrates an exemplary personal communication device functioning as a controlling device.

Turning momentarily to FIG. 6, by way of example only, such a GUI page may comprise HTML data 600 as illustrated. When rendered on a personal communication device 402, such an HTML page may appear as illustrated at 602. In particular such a GUI page display may comprise a series of icons representative of appliance control actions which may be initiated from the displaying client device. When one of the displayed icons or links is selected (it will be appreciated that such selection may be by touch, by cursor movement, by operation of navigation keys, etc., as appropriate to the particular client device currently rendering the GUI page) this may result in a message being transmitted back to the originating slave relay device, receipt of which causes the desired command(s) to be issued to an appliance. By way of more detailed example, the GUI page display 602 of the embodiment illustrated in FIG. 6 comprises six channel selection icons, four of which are configured to cause a tunable appliance (e.g., set top box 106) to be set to particular channel, while the remaining two are configured to issue generic "channel up" and "channel down" commands to the appliance. To this end, the HTML data comprising GUI page 600 may include six HTML "tags" such as for example tag 604 corresponding to the broadcast TV channel "ABC" or tag 606 corresponding to the "channel up" function. In this implementation, each tag comprises a definition of an icon to be displayed, e.g., "abc_button.png" (in this example, a graphic file to be retrieved from the originating server), an action to be taken if and when the icon is selected (in this example, an HTTP request back to the originating server for a filename such as for example "switch_to_abc.irm" or "channel_up.irc"), and size and formatting information for positioning the displayed icon.

Returning now to FIG. 5, if the operating program of the slave relay device has determined that a received communication is not a function command from an associated universal controlling device and is not a GUI page request, it next determines at step 510 if the received message is a request for an individual appliance command function (e.g., "Channel up", "Mute" or "Pause"). This may be determined, for example, by the type or format of the request. By way of further specific example, in the HTML example described above in conjunction with FIG. 6, the file extension ".irc" may have special significance to the slave relay device operating software, i.e., receipt of a request for "channel_up.irc" may cause the operating software to retrieve from the stored appliance code data the appropriate command value and control protocol and use these to transmit the requested command to the designated appliance as illustrated at steps 524 and 526. The manner in which an association is formed between a function request and the appropriate appliance command will be discussed in greater detail later. Thereafter, at step 528 the operating software may determine the next GUI page to be presented, if any, and serve this back to the requesting client device as previously described.

If the received communication is not a request for an individual appliance command function, the operating software next checks if the request is for a sequence of commands (e.g., the digits "0", "0", "7" to tune to channel seven). Once again, this may be determined, for example, by the type or format of the request. If the request is for a command sequence, the desired series of commands is determined at step 522 and then transmitted to the specified appliance(s) in similar manner to that described previously. By way of further specific example, in the HTML example described above in conjunction with FIG. 6, the file extension ".irm" may have special significance to the slave relay device operating software, i.e. receipt of a request for "switch-to-abc.irm" may cause the operating software to retrieve a stored series of commands operable to change a pre-determined channel tuning device to the ABC broadcast channel and transmit these to that appliance. The manner in which an association is formed between a command sequence request and a series of appliance command will be discussed in greater detail later. Upon completion of the sequence transmission, the operating software may determine the next GUI page to be presented, if any, and serve this back to the requesting client device as previously described. By way of example, on completion of a channel changing sequence, it may be desirable to automatically switch to a GUI page from which television volume may be controlled, e.g., the page 412 illustrated in FIG. 4a.

Finally, at step 542 the operating program of the slave relay device may check for other valid requests (for example, requests for icon graphics as mentioned above in conjunction with the HTML data of FIG. 6). If valid, other requests may be serviced as appropriate at step 544, else an error message may be returned to the requesting client device.

Figure 7:
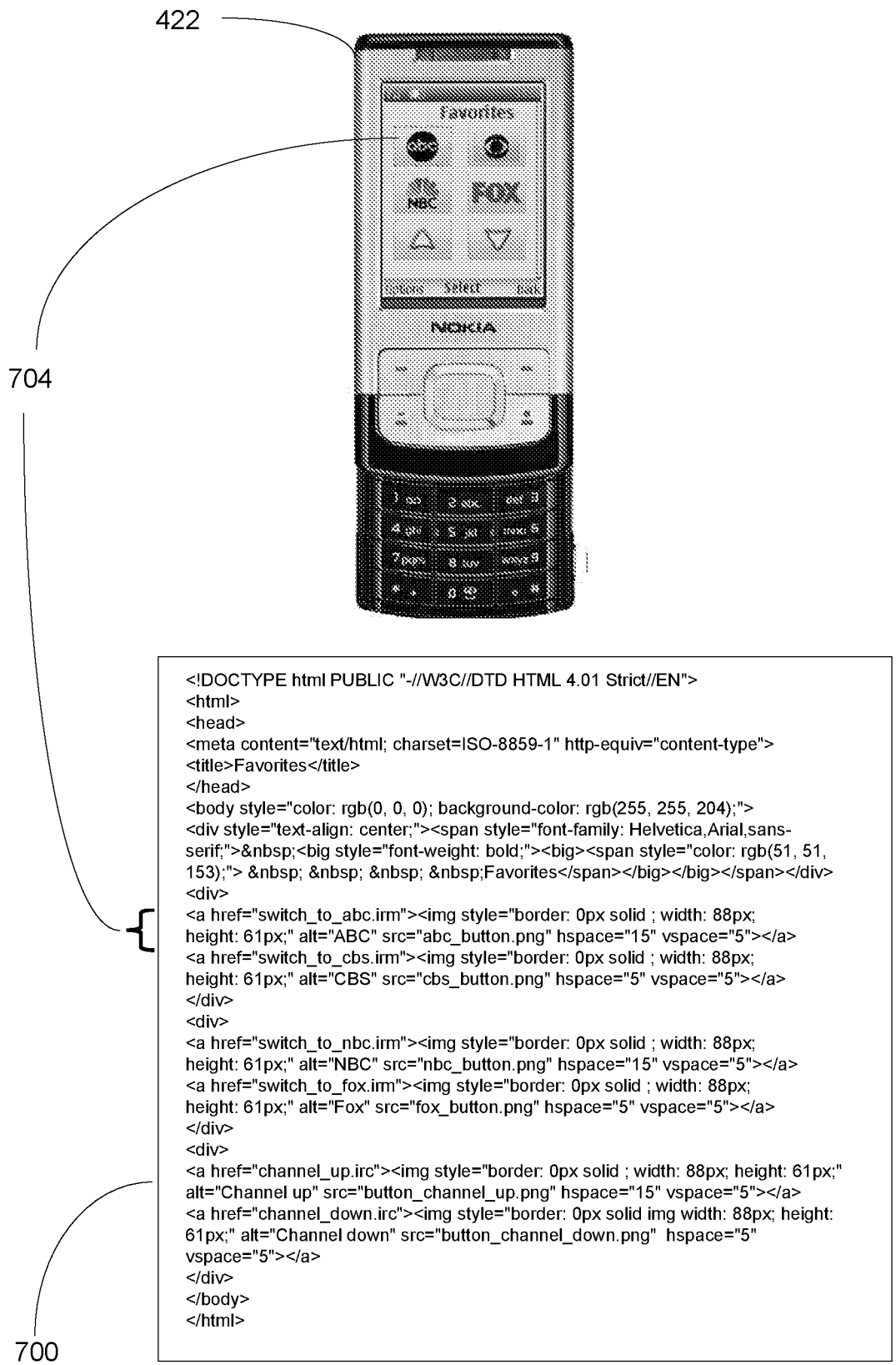
FIG. 7 illustrates a second exemplary personal communication device functioning as a controlling device.

As mentioned above in connection with step 538 of FIG. 5, GUI pages to be served may be scaled, reformatted, or selected to match the capabilities of the requesting client device. By way of specific example, again using HTTP as an exemplary transfer protocol, the HTTP request header issued by client device 402 illustrated in FIGS. 4a and 6 may include a user agent string such as:

User-Agent=[Mozilla/5.0 (iPhone; u; CPU like Mac OS X; en) AppleWebKit/420.1 (KHTML, like Gecko) Version/3.0 Mobile/4A102 Safari/419.3]

while the HTTP request header issued by client device 422 illustrated in FIGS. 4b and 7 and may include a user agent string such as:

User-Agent=[Nokia6500s-½.0 (04.80) Profile/MIDP-2.1 Configuration/CLDC-1.1]

Upon receipt of an HTTP "GET" command requesting a GUI page, the operating program of a slave relay device may examine the request header contents (or forward them to another system for examination) to determine an appropriate format for the GUI page to be served. Continuing the specific example, an examination of the HTML defining the "ABC" tags illustrated at 604 and 704 will reveal that the size of the button icon (i.e., the "width" and "height" parameters) is adjusted to better match the screen resolution, screen size, orientation capabilities, and rendering engines of the respective client devices 402 (e.g., an Apple iPhone) and 422 (e.g. a Nokia6500s).

Figure 8:
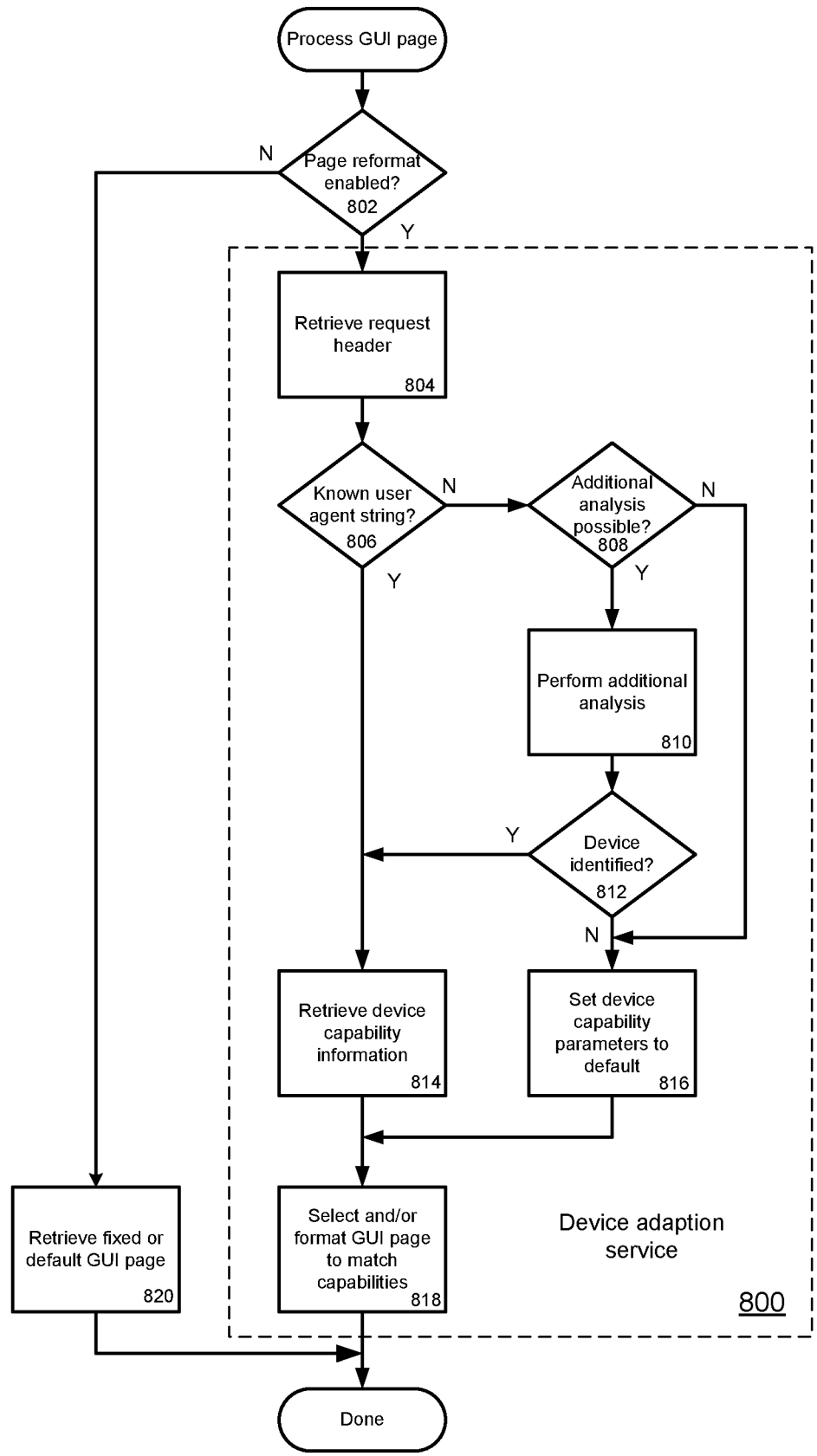
FIG. 8 illustrates in flow chart form an exemplary method for adapting or selecting GUI pages to match the capabilities of exemplary personal communication devices.

Turning now to FIG. 8, by way of further example a method by which GUI pages may be modified or selected to match specific requesting client devices, corresponding to steps 534 and 538 of FIG. 5, is illustrated in greater detail once again using HTTP as an exemplary transfer protocol, without limitation. Having determined that a particular GUI page (for example, an HTML file) is to be served to a requesting client device, the operating software of the exemplary slave relay device 100 may, at step 802, determine if GUI page scaling/selection is enabled. If not, at step 820 a fixed GUI page is returned and no further page formatting action is taken. This may occur, for example, when an author of a group of universal remote control GUI pages has decided to support only a lowest common denominator set of client device capabilities, when a specific GUI page comprises only a single function such as a status message or on/off button, etc. In various embodiments such pages may be stored in memory 302,304,306 of slave relay device 100, may be retrieved from a local 202 or remote 210 server by the slave relay device 100, or a combination thereof, as appropriate. In addition, it will be appreciated that such pages may be stored in a local 202 or remote 210 server and merely caused by the slave relay device 100 to be forwarded to the client device via an appropriate communications channel. Still further, the local 202 or remote 210 server may forward such pages to the client device via an appropriate communications channel upon seeing a page request being issued from the client device without requiring the slave relay device 100 itself to initiate any operations associated with such page fulfillment requests.

If however GUI page scaling/selection is enabled, a device adaptation service 800 may be invoked. At step 804 the user agent string may be retrieved from the client device's HTTP request header, which as previously illustrated may contain information which serves to identify the requesting client device. If the user agent string is recognized at step 806, device capability information corresponding to the requesting client device is retrieved at step 814. By way of example only, in one contemplated embodiment client devices may be categorized into several classes based on maximum supported horizontal screen resolution, e.g., less than 105 pixels, 106 to 175 pixels, 176 to 239 pixels, 240 to 319 pixels, 320 to 639 pixels, etc., etc. Once a client device has been identified, its class may be determined via a look-up table and an appropriate HTML file selected by the device adaptation service at step 818 from a library of pre-formatted versions of each GUI page, one for each device class. Alternatively, in another exemplary embodiment, a single master HTML file may be created for each GUI page based on a default resolution, and then scaled by the device adaptation service at step 818 to match the exact resolution of the target client device, once again determined from a look-up table. In this regard, it should be noted that certain client device browser implementations may be adapted to compress or shrink received graphic pages in order to emulate a browser screen of greater resolution than that of the underlying personal communication device hardware. In such instances, it will be appreciated that the parameters used by the device adaptation service in creating or scaling GUI pages should match the emulated, and not the actual, resolution of the target client device. Further, in various embodiments, other client device capabilities, e.g., color versus monochrome, touch screen selection of icons versus navigation keys, etc., may also be used to additionally refine GUI pages to match a specific target client device.

In the event a user agent string is not immediately recognized, e.g. by being found in a look-up table as described above, at step 808 a determination is made by the device adaptation service whether additional analysis is possible. When possible, at step 810 such analysis may include forwarding the user agent string data to additional search services for further processing, inspection of additional fields in the HTTP request header (e.g., a URL pointing to profile data for the client device), direct interaction with the requesting client device, etc. By way of specific example, the HTTP request header issued by client device 422 illustrated in FIGS. 4b and 7 may include a reference to a device profile, e.g.:

x-wap-profile=["http://nds1.nds.nokia.com/uaprof/N6500sr100.xml"]

which profile data, when retrieved from the indicated URL, may include for example statements such as:

<prf:ColorCapable>Yes</prf:ColorCapable>
...
<prf:ImageCapable>Yes</prf:ImageCapable>
...
<prf:ScreenSize>240x320</prf:ScreenSize> which are indicative of the capabilities of that client device.

As illustrated at step 812, if the client device is successfully identified via these further measures, the device adaptation service proceeds with retrieval of client device capability information at step 814, else at step 816 the client device capabilities are set to a default value, for example the most common capability set, the set of capabilities used in creating a master HTML file, etc.

As will be appreciated, the steps of the exemplary method described above in conjunction with FIG. 8 may be performed locally by the operating software of the slave relay device, or by a service hosted on a local (e.g. 202) or remote (e.g. 210) computer system and available to the operating software via network(s) 406, 206, or by any combination thereof, as appropriate to a particular embodiment. For example, the service performed by the device adaptation service may be performed at the slave relay station itself, may be performed at another device in communication with the slave relay station with a modified HTML page being returned to the slave relay station for transfer, and/or may be performed at a device in the communication channel between the slave relay station and the requesting client device whereupon a HTML page received or already stored by such device is modified prior to its being forwarded on to the requesting client device. Accordingly the above descriptions are not intended to be limiting as to location of the various steps of the device adaptation services described.

In order to create fully functional GUI page definitions for use in the above described systems, a means may be provided to generate graphic pages with activatable icons suitable for rendering by target client devices (e.g., HTML files) as well as means to generate an association between each activatable icon and a desired control action on the part of the host slave relay device. While these activities may be performed as separate steps using separate tools, for example, any convenient HTML editor to generate loadable graphic pages with embedded tags and any convenient text editor to create slave relay device-recognizable XML files defining the actions to be taken for each tag, in certain embodiments a single software tool may be made available to perform both functions, thereby offering greater ease of use and consistency of output. Advantageously, this may comprise an extension to an editor provided for creation and/or modification of the graphic user interface of a universal controlling device (e.g. controlling device 102) used in conjunction with the slave relay device (e.g. device 100), examples of which may be found described in the previously referenced and incorporated U.S. Pat. Nos. 7,266,777, 6,211,870, 6,937,972 and pending U.S. patent application Ser. No. 11/357,681.

Figure 9:
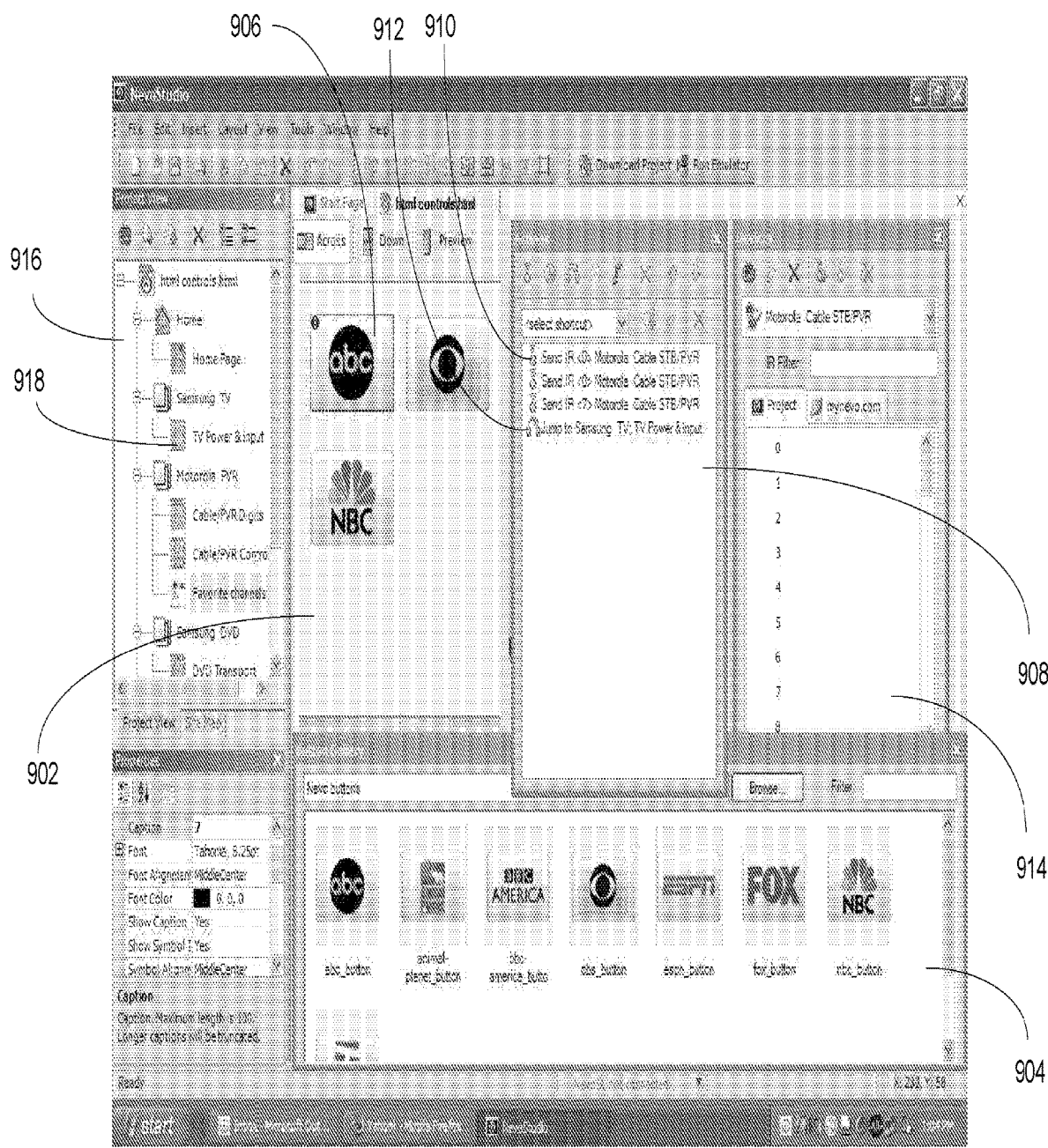
FIG. 9 illustrates an exemplary editing program which may be used to create GUI pages for use with personal communication devices.

Turning now to FIG. 9, there is illustrated an exemplary editor adapted to support the creation of GUI files for use with a slave relay device as described above. Such an editor application may be resident on a local PC (e.g., PC 202) or may be located remotely and used to create edited GUI pages for later transfer to the local systems. In either case, the editor screen 900 comprises a layout area 902 in which a WYSIWYG image of the GUI page under creation may be displayed, together with a gallery of icons 904 from which images be dragged and placed into layout area 902. After placement into the layout, an icon, for example 906, may be selected and the action or series of actions to be performed upon activation of that icon may be defined in an actions panel 908. Such actions may, for example include transmission of appliance commands 910, the specification of such commands being performed by dragging specific actions from a displayed device function list 914 into action panel 908; or GUI page switching actions 912, specified by dragging pointers to other GUI pages, e.g. 918, from a page tree 916 into action panel 908. In the exemplary embodiment, once the layout is completed and all actions specified to the satisfaction of the user, the edited GUI may be saved as a group of files suitable for use by a slave relay device acting as a server to a requesting client device. It will be appreciated that in accordance with the needs of the device adaptation service(s) of the particular embodiment, the GUI definition may be saved as a single master version suitable for scaling, as a set of several selectable file groups, one for each class of client device to be supported, etc.

Figure 10A:
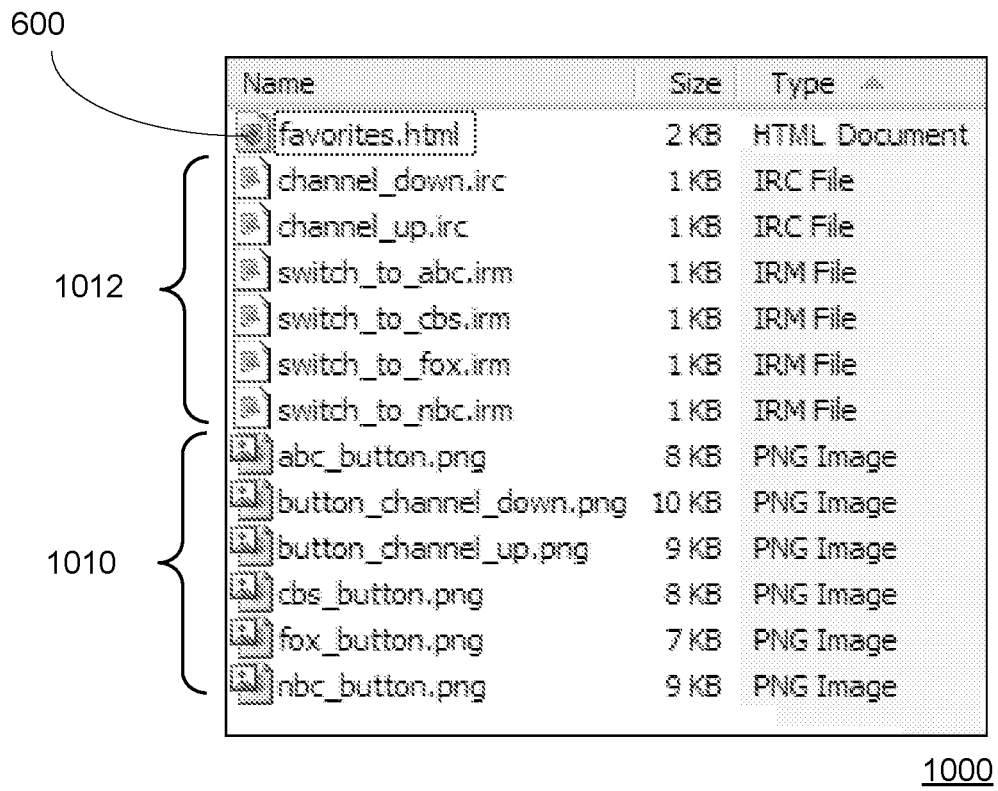
FIG. 10a illustrates an exemplary set of data files which may define a GUI page from which an appliance may be controlled.
Figure 10B:
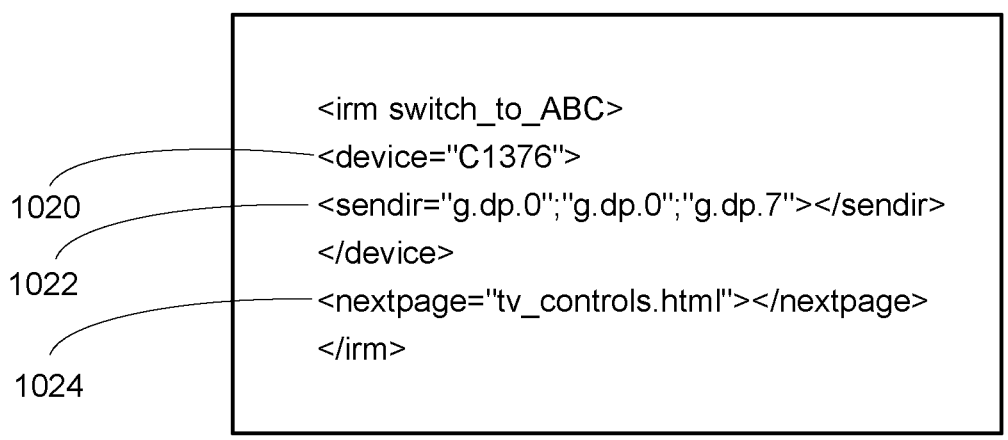
FIG. 10b illustrates an exemplary tag file comprising XML which may be executed by a slave relay device to effect control of an appliance.

By way of example only, FIG. 10a illustrates such a group of files 1000. As illustrated, this group may comprise an HTML file 600 to be served to the requesting client device together with the resources to support that page, for example, graphics files 1010 representing icons to be displayed and tag files 1012. Tag files 1012 may specify the actions to be performed by a slave relay device when an HTML tag is activated on the client device. In an illustrative embodiment tag files may comprise a series of XML statements to be executed by the operating software of a slave relay device, e.g., device 100. By way of further example only, FIG. 10b illustrates an exemplary XML encoding of the tag file "switch_to_abc.irm," corresponding to the editor action panel 908 of FIG. 9 and the HTML statement 604 of FIG. 6. The illustrative tag file content includes a definition 1020 of the appliance to which commands are to be directed, a list 1022 of the functions to be transmitted, and a specification 1024 of the GUI page to be served the client device upon completion of the command transmission. In summary, when the exemplary slave relay device receives an HTTP "GET" request for "switch_to_abc.irm" from a client, this will result in appliance type "C1376" (e.g., a Motorola cable STB) being commanded to tune to channel "007" (e.g., by transmitting the digit commands "0", "0" and "7" in sequence) after which the GUI page "tv_controls_html" will be retrieved and served to the requesting client device (with appropriate scaling and/or reformatting if this is enabled).

The data files which comprise the GUI pages to be supported by the slave relay device may be downloaded directly to it for storage in memory (e.g., memories 302, 306), or may be stored on a local (e.g., computer 202) or remote (e.g., computer 210) server system and accessed on an as needed basis by slave relay devices (e.g. 100) for transfer to the client device. In the latter example, the data transfer may take place by having the requested data downloaded to and served from the slave relay station to the client device and/or by having the requested data served directed from the storage source to the client device via the network . Further, it will be appreciated that in some embodiments these data may reside in multiple locations, for example HTML files (e.g., HTML page 600) may be stored locally on a slave relay device while resources such graphics files (e.g., button images 1010) may be stored on a network-accessible server (e.g., computers 202 or 210) and retrieved on an as needed basis by the slave relay device, or even directly by a client device.

In certain embodiments, it may also be desirable to allow a user to configure appliance control functionality directly on a personal communication device without necessitating the use of a separate editor application as described above. In this regard, it will be appreciated that an HTML or other markup language generating application or "engine" (such as ActiveX software technology developed by Microsoft Corporation, or that described in U.S. Pat. No. 7,216,298 assigned to Oracle Corporation, which is hereby incorporated by reference herein in its entirety) may be stored on or made available to the slave relay device, or stored on a network-accessible server (e.g., computers 202 or 210) and used or retrieved on an as needed basis by the slave relay device, or even directly by a client device. In this way a user may be presented with a generic interface for purposes of setting up her client device to control the desired appliance(s) upon an initial interaction with the engine (e.g., browsing to the IP or host URL of the slave relay device). As described herein, the engine may be configured to read and analyze user agent string information from the client device in order to present a generic interface appropriate for display on the particular requesting client device, and/or to customize various features and functions presented to the user during a setup process or subsequent control based operations. During the setup process a user may interact with the engine to set up individual appliances (e.g., devices 104, 106, 108, etc) using device type and model number searching, direct code entry from a library of available codes, or a variety of other known universal remote control setup techniques as may be configured in the engine. For each appliance set up via the engine a default interface may be automatically generated and presented to the user for immediate testing and/or operation of appliance commands via the slave relay device. After set up of individual devices a user may save the whole configuration for later customization either on the slave relay device, on a network-accessible server (e.g., computers 202 or 210) or even directly on the client device. It will be appreciated that such configuration actions may be completely in lieu of, or may be a prelude to further refinement of the GUI using, for example, an editor application as described previously.

Figure 11:
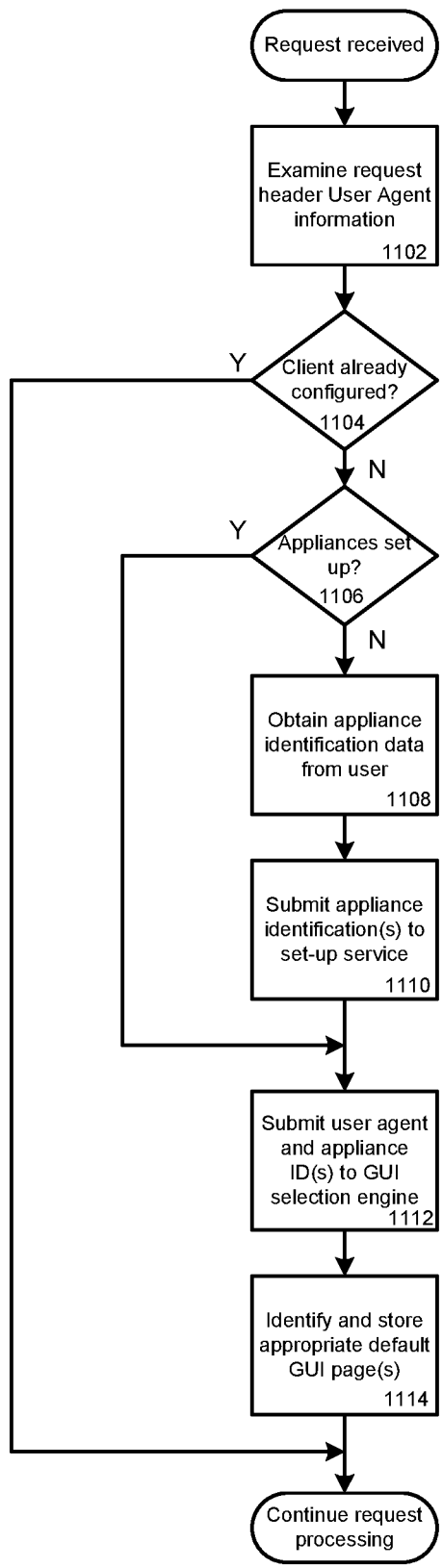
FIG. 11 illustrates in flow chart form another exemplary method for adapting or selecting GUI pages to match the capabilities of an exemplary personal communication device.

By way of further example, turning to FIG. 11 there is illustrated a series of steps which in certain embodiments may be performed, for example, between steps 504 and 506 of the flowchart previously presented in FIG. 5. Upon receipt of a request message, the operating software of a slave relay device may at step 1102 examine the request header user agent information in order to identify the requesting client device type. If the client device is determined to be an already configured client at step 114, processing continues as previously described in conjunction with FIG. 5. If not, the operating software next checks at step 1106 if the target appliances to be controlled have been identified and set up, i.e., that the appropriate appliance code data and protocols have been identified and are available for use by the operating software. If not, the operating software at step 1108 may interact with the user (e.g., via HTTP and pre-formatted HTML pages) to obtain appliance identification information. Such information may include for example, appliance types, brand name(s), model number(s), set up codes derived from a printed list or web-based look up site, etc. without limitation. At step 1110, the obtained appliance identification(s) are submitted to a set-up service. Such a set up service may be part of the operating software of slave relay device 100, or may be an application hosted on a local 202 or remote 210 computing system, or any combination thereof. The set up service may analyze the submitted appliance identification information and identify to the operating software of slave relay device 100 which appliance code data and protocols are to be used to communicate to each of the appliances. In certain embodiments, if the necessary appliance code data and/or protocol definition are not already present in a pre-programmed library of the slave relay device, these may be downloaded into the slave relay device by the set up service. Once the appliances to be controlled have been identified, at step 1112 the user agent and appliance identity information may be submitted to a GUI selection engine, e.g., as described above, which may once again be part of the operating software of slave relay device 100, or may be an application hosted on a local 202 or remote 210 computing system, or any combination thereof. It will also be appreciated that the set up service and the GUI selection engine may be separate application programs, resident on different computing systems or co-resident on a single system; or may be combined into a single application program, as appropriate for a particular implementation. Based upon the supplied information, the GUI selection engine may select and/or generate appropriate default HTML GUI pages commensurate with the capabilities of the client device and the control functions of the target appliance (for example, a page scaled for the display of the client device providing function keys only for operations that are actually supported by the target appliance). At step 1114 these pages (or pointers thereto) are identified and stored by the operating software of slave relay device 100, where after they may be used to service HTTP requests from the identified client device. It will be appreciated that alternative embodiments providing similar functionality are also possible: for example, a slave relay device may store only the user-supplied appliance identification information and re-submit this together with the user agent identity every time a request is received, e.g., using a GUI selection engine which re-generates the HTML GUI page(s) for every instance of use.

In order to guard against unauthorized manipulation of a user's appliances, various security measures may be implemented to limit GUI page access to only authorized clients. These may take the form of, for example, password protection of a slave relay device's master (e.g., "home") pages, restriction of access to only certain pre-defined client devices (e.g., using MAC or IP address filtering), mutual authentication, or any other suitable method, all as are well known in the art.

While various concepts have been described in detail, it will be appreciated by those skilled in the art that various modifications and alternatives to those concepts could be developed in light of the overall teachings of the disclosure. For example, while many of the exemplary embodiments above are described in terms of HTP and HTML methodologies, it will be appreciated that other communication and transfer protocols may be used as appropriate. Further, while an exemplary slave relay device communicates with controlled appliances via an IR signal, it will be appreciated that for the purposes of this invention various alternate embodiments of slave relay device may communicate with controlled appliances via any combination of IR, RF and/or hard wired connections. Yet further, it will be appreciated that while the exemplary slave relay devices of the illustrative embodiments are presented as stand alone units, in alternative embodiments the described slave relay device functionality may be incorporated into one or more of the controlled appliances, or accommodated in any other convenient item of furniture or equipment, as appropriate for a particular implementation.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents and published documents cited within this application are hereby incorporated by reference in their entirety.

What is claimed is:

1. A non-transitory, computer-readable media having stored thereon instructions, the instructions, when executed by a device, cause the device to perform steps, comprising:
   receiving data that at least identifies by name a one of a plurality of media content sources;
   using the data that at least identifies by name the one of a plurality of media content sources to locate a sequence of commands to be used to cause a display device to present a media content stream that originates from the named one of the plurality of media content sources; and
   causing the located sequence of commands to be executed whereupon the media content stream that originates from the named one of the plurality of media content sources will be presented on the display device.

2. The non-transitory, computer-readable media as recited in claim 1, wherein the name comprises the name of a television network broadcaster and wherein the sequence of commands comprises a sequence of tuning commands that are transmittable by the device to the display device for execution by the display device.

3. The non-transitory, computer-readable media as recited in claim 2, wherein display device comprises a television.

4. The non-transitory, computer-readable media as recited in claim 1, wherein the name comprises the name of a television network broadcaster and wherein the sequence of commands comprises a sequence of tuning commands that are transmittable by the device to a set-top box associated with the display device for execution by the set-top box.

5. The non-transitory, computer-readable media as recited in claim 1, wherein the data that identifies by name a one of the plurality of media content sources is received by the device from the personal communication device in a network protocol request message.

6. The non-transitory, computer-readable media as recited in claim 1, wherein the instructions cause a graphical user interface page to be presented on a personal communication device in communication with the device and wherein a user interaction with the graphical user interface page causes a receipt by the device of the data that identifies by name a one of the plurality of media content sources.

7. The non-transitory, computer-readable media as recited in claim 6, wherein the instructions cause the graphical user interface page to be retrieved from a server device prior to causing the graphical user interface page to be presented on the personal communication device.

8. The non-transitory, computer-readable media as recited in claim 6, wherein the instructions cause the graphical user interface page to be placed into a form determined to be appropriate for display capabilities of the personal communication device.

9. The non-transitory, computer-readable media as recited in claim 8, wherein the data indicative of the capabilities of the personal communication device comprises data indicative of a make and model of the personal communication device.

10. The non-transitory, computer-readable media as recited in claim 9, wherein the data indicative of the capabilities of the personal communication device comprises data indicative of an identity and revision of software used in connection with a display of the personal communication device.

* * * * *